OR 1,993,719

Patented Mar. 5, 1935

1,993,719

UNITED STATES PATENT OFFICE 1,993,719

PRODUCTION OF TERTIARY-BUTYL CHLORIDE

Howard S. Nutting, Edgar C. Britton, Myron E. Huscher, and Peter S. Petrie, Midland, Mich., assignors to The Dow Chemical Company, Midland, Mich., a corporation of Michigan No Drawing. Application January 27, 1933, Serial No. 653,866

19 Claims. (Cl. 260—166)

The present invention concerns an improved method of producing tertiary-butyl chloride from isobutyl chloride.

It is known that isobutyl bromide, when heated to about 250° C. in the presence of a catalyst such as platinized asbestos, is converted into tertiary-butyl bromide in good yield. It is also known that, when isobutyl chloride is similarly heated in the presence of a catalyst, such as barium chloride, thorium chloride, pumice, aluminum oxide, etc., some tertiary-butyl chloride is often formed, but the yield thereof is low.

The principal reactions involved in converting isobutyl chloride into its tertiary isomer may be represented by the following equations:—

(1) $(CH_3)_2CH—CH_2Cl \rightarrow (CH_3)_2C=CH_2 + HCl$ (2) $(CH_3)_2C=CH_2 + HCl \rightleftharpoons (CH_3)_3CCl$ The reaction represented by Equation (1) is favored both by high temperatures and by catalysts e. g. those already mentioned. We have found the reaction involved in recombining isobutylene with hydrogen chloride to form tertiary-butyl chloride, as represented by Equation (2), to be an equilibrium reaction which may be promoted by catalysts and which shifts toward the formation of tertiary-butyl chloride as the reaction temperature is lowered.

The general method which others have employed in attempting to convert isobutyl chloride into tertiary-butyl chloride was to pass isobutyl chloride vapors through a heated tube containing a catalyst such as pumice, barium chloride, thorium chloride, etc. Sabatier and Maihle, Compte Rendus 156, 658 (1913), for instance, passed isobutyl chloride vapors through a tube 1 meter in length containing a charge of thorium chloride for 35 centimeters of its length, followed by a loose asbestos packing and then a charge of granular pumice for 50 centimeters of its length. The isobutyl chloride vapors, during passage through the tube, were first contacted with the thorium chloride catalyst which was heated to about 250° C. The vapors then passed through the asbestos packing and thence over the granular pumice, which was at about 200° C. By operating in such manner, Sabatier and Maihle claim to have converted approximately 40 per cent of the isobutyl chloride employed into tertiary-butyl chloride.

Due to the low yield of product obtained during previous attempts to convert isobutyl chloride into tertiary-butyl chloride, the method of conversion has never become of commercial importance.

We have now found that the yield of tertiary-butyl chloride can be increased materially by first contacting isobutyl chloride with a dissociation catalyst heated to a temperature high enough to dissociate most of the isobutyl chloride into isobutylene and hydrogen chloride, then cooling the vapor mixture to a temperature below 150° C., preferably below 100° C., and contacting the cooled mixture with a catalyst capable of promoting the chemical addition of hydrogen chloride to isobutylene.

To the accomplishment of the foregoing and related ends, the invention, then, consists of the method hereinafter fully described and particularly pointed out in the claims, the following description and examples setting forth in detail but several of the various ways in which the principle of our invention may be employed.

While we may employ isobutyl chloride derived from the corresponding alcohol or from any other source as a reactant in preparing tertiary-butyl chloride according to our method, we have found that isobutyl chloride can be obtained at lowest cost through the chlorination of isobutane. In chlorinating isobutane to obtain monochlorinated derivaties therof, isobutyl chloride is usually formed as the principal reaction product, accompanied by about one-fifth its molecular equivalent of tertiary-butyl chloride and by relatively small quantities of polychlorinated by-products and of chloro-isobutylenes. Such chloro-isobutylenes, we have found, boil at approximately the same temperature as does isobutyl chloride and tend to accompany the isobutyl chloride during separation of the latter from the chlorination mixture. When such isobutyl chloride which contains an appreciable quantity of a chloro-isobutylene or, in fact, of any chloro-olefine, e. g. chloro-amylene, chloro-isoamylene, etc., is converted into tertiary-butyl chloride according to the method herein described, the chloro-olefine impurity contaminates, and poisons the catalyst employed to promote dissociation of the isobutyl chloride. As a result the activity of the catalyst is reduced rapidly, so that the period of time over which the process can continuously be operated to produce tertiary-butyl chloride in satisfactory yield is greatly shortened.

We have found that the chloro-olefines present in such impure isobutyl chloride can be removed by converting said chloro-olefines into saturated compounds, e. g. dichloro-isobutanes, trichloro-isobutanes, etc., which can readily be separated from the isobutyl chloride in any of a number of ways. For instance:—

(1) The impure isobutyl chloride can be treated either with bromine or with chloro-sulfonic acid in amount sufficient to react with the chloro-olefine impurities and substantially pure isobutyl chloride can be fractionally distilled from the resultant mixture;

(2) The chloro-olefine impurities can be extracted from the isobutyl chloride with concentrated sulphuric acid and any sulphuric acid remaining in the isobutyl chloride can be extracted from the latter with water;

(3) The impure isobutyl chloride can be heated under superatmospheric pressure with hydrogen chloride in amount sufficient to react with the chloro-olefines and substantially pure isobutyl chloride can be distilled from the resultant mixture;

(4) The impure isobutyl chloride can be treated, in the presence of a catalyst capable of promoting chemical addition of hydrogen chloride to olefines, with hydrogen chloride in amount sufficient to react with the chloro-olefines present and substantially pure isobutyl chloride can be distilled from the reacted mixture;

(5) The impure isobutyl chloride can be agitated either with water, dilute sulphuric acid, or an aqueous ferric chloride solution and can simultaneously be treated with chlorine in amount sufficient to react with the chloro-olefine impurities and substantially pure isobutyl chloride may be distilled from the organic layer of the reacted mixture.

When purifying isobutyl chloride according to method (3), above, we prefer to heat the mixture of impure isobutyl chloride and hydrogen chloride in a closed acid-resistant bomb fitted with a pressure gauge. As the temperature of the mixture is raised the gauge pressure increases to a corresponding extent until a temperature is reached at which hydrogen chloride reacts with the chloro-olefine impurities to form saturated compounds, e. g. dichloro-isobutanes. When such reaction temperature is reached, the gauge pressure drops sharply due to the absorption of hydrogen chloride by the chloro-olefines. The reaction mixture is preferably maintained at a constant reaction temperature until the gauge pressure becomes contant, after which the bomb is cooled and the charge removed therefrom. The reacted mixture is washed with water and fractionally distilled to obtain substantially pure isobutyl chloride.

If a highly active catalyst, e. g. antimony trichloride, bismuth trichloride, stannous chloride, etc., is used in purifying isobutyl chloride according to the above method (4), the treatment can be carried out at atmospheric pressure and at a temperature as low as 50° C. If a less active catalyst, e. g. pumice, activated charcoal, etc., is used, it may be necessary to carry the treatment out at a higher temperature under superatmospheric pressure.

If the purification of isobutyl chloride according to method (5) is carried out in the absence of water, the chlorine used reacts with isobutyl chloride almost as readily as with the chloro-olefine impurities. By having water present in the mixture, however, the chlorine reacts selectively with the chloro-olefines and leaves the isobutyl chloride substantially unattacked. Sulphuric acid and ferric chloride serve as catalysts to promote chlorination of the chloro-olefine impurities.

In preparing tertiary-butyl chloride according to our method, isobutyl chloride, which is substantially free of chloro-olefines, may be vaporized, the vapors preheated preferably to about 200° C., and the preheated vapors passed over a dissociation catalyst, e. g. aluminum oxide, heated to a temperature above about 200° C. and preferably above 230·° C. During contact wth such catalyst most of the isobutyl chloride is dissociated into isobutylene and hydrogen chloride, while a very small portion of the isobutyl chloride is dissociated to form hydrogen chloride and a normal butylene.

The dissociated vapor mixture is next cooled to a temperature below about 150° C. and preferably below 100° C. During such cooling operation the vapors may, if desired, be condensed to a liquid and the liquid may be cooled to any desired temperature. We prefer, however, to maintain the cooled mixture in vapor form, as the latter can most conveniently be handled in the next operation of the process.

The cooled mixture is contacted at a temperature below 150° C., and preferably below 100° C., with any of a wide variety of catalysts (e. g. aluminum oxide, kaolin, silica gel, antimony trichloride, calcium chloride, etc.) capable of promoting reaction between isobutylene and hydrogen chlorine to form tertiary-butyl chloride.

After being contacted with the last mentioned catalyst, tertiary-butyl chloride can be separated from the reaction mixture in any of the usual ways, e. g. by condensing said mixture and fractionally distilling the tertiary-butyl chloride therefrom. The unreacted isobutyl chloride and polymerized by-products from the reaction, e. g. di-isobutylene, can then be recycled through the operations already described to form an additional quantity of tertiary-butyl chloride.

Instead of employing aluminum oxide to promote the dissociation of isobutyl chloride into isobutylenes and hydrogen chloride, any of a wide variety of other catalysts, e. g. alkaline earth metal chlorides, thorium chloride, platinized asbestos, etc., may be used. Again, when the dissociation is carried out at a temperature considerably higher than 200° C., catalysts which are less active than those which have been mentioned may advantageously be used. For instance, carbon and metals such as iron, KA2S steel (a corrosion-resistant steel containing approximately 18 per cent of chromium and 8 per cent of nickel), nichrome, copper, etc., have relatively little effect in promoting the desired dissociation at temperatures below about 300° C. At temperatures above about 400° C., however, the last mentioned materials display considerable catalytic activity and at temperatures above about 500° C. said materials appear to promote as complete a dissociation of the isobutyl chloride as do any of the more active catalysts which have been mentioned. By employing the less active catalysts, when dissociating the isobutyl chloride at the higher reaction temperatures, the loss of materials through by-product formation is reduced.

The dissociation of isobutyl chloride into isobutylene and hydrogen chloride may be carried out at any temperature above 200° C. and below the temperature at which the conversion of isobutylene into carbon and/or polymerized materials, etc., takes place to such extent as to render further operation uneconomical. A small quantity of by-products such as those mentioned above are nearly always formed in the process. Also, the extent to which the isobutylene is decomposed and/or polymerized is dependent not only upon the temperature at which the dissociation is carried out, but also upon the specific catalyst used to promote the dissociation, the time during which the reacting vapors are exposed to such catalyst, etc. The upper temperature at which the dissociation of isobutyl chloride may successfully be carried out is, then, dependent upon the particular combination of operating conditions which may be employed, and cannot be specified. However, we have dissociated isobutyl chloride in the presence of aluminum oxide at a temperature as high as 650° C. and from the dissociated vapor mixture have produced tertiary-butyl chloride in excellent yield.

The catalyst employed to promote the dissociation of isobutyl chloride into isobutylene and hydrogen chloride gradually loses its catalytic activity, especially when used at the lower reaction temperature. Such de-activation of the catalyst, apparently, is due to the same becoming coated over or impregnated with carbon and/or organic compounds. When aluminum oxide is employed as a dissociation catalyst, it may readily be reactivated by heating the same to about 190° C. or higher and blowing a stream of air or oxygen therethrough. A great amount of heat is liberated and, unless carefully controlled, the temperature may rise spontaneously to 1000° C. or higher. We prefer, however, to maintain the aluminum oxide at a temperature between about 450° and 800° C. during the reactivation. The temperature may be controlled either by controlling the rate at which air or oxygen is blown over the catalyst, by diluting such air or oxygen with a relatively inert gas such as nitrogen, carbon dioxide, etc., or by cooling the catalyst while blowing air or oxygen over the same. Blowing is continued until the liberation of heat from the catalyst is no longer observed.

The following examples illustrate several ways in which the principle of our invention has been employed. It is to be understood, however, that said examples are purely illustrative and are not to be construed as a limitation on the invention.

Example 1

A mixture of 2 kilograms of 50 per cent sulphuric acid and 16.2 kilograms of impure isobutyl chloride, containing approximately 10.6 per cent of chloro-isobutylenes, was stirred vigorously and maintained at a temperature between 25° and 30° C. while 730 grams of chlorine was gradually passed into the same. The mixture was then permitted to settle and the organic layer thereof was separated and fractionally distilled to obtain 12.76 kilograms of isobutyl chloride containing less than 0.4 per cent of chloro-isobutylenes.

Example 2

A mixture of 100 grams of concentrated hydrochloric acid, 20 grams of ferric chloride, and 1320 grams of crude isobutyl chloride containing approximately 13.6 per cent of chloro-isobutylenes was stirred vigorously and maintained at a temperature between 30° and 35° C. while 72 grams of chlorine was gradually introduced into the same. The chlorinated mixture was permitted to settle and the organic layer thereof was separated. Said organic layer was consecutively washed with about 120 cubic centimeters of water, treated with soda ash in amount sufficient to neutralize any acid contained therein, and dried over calcium chloride. The dried material was fractionally distilled to obtain 929 grams of isobutyl chloride containing less than 0.4 per cent of chloro-isobutylenes.

Example 3

3.02 kilograms of purified isobutyl chloride, containing approximately 0.3 per cent of chloro-isobutylenes, was gradually vaporized and the vapors were passed, during a 24 hour period, in continuous and substantially constant flow through a reaction system consisting of a preheater, a dissociation chamber, a cooler, a recombination chamber, and a condensing apparatus. During passage through the preheater, the vapors were heated to about 200° C. The preheated vapors passed directly through the dissociation chamber which was maintained at about 256° C. and which consisted of a 0.5 inch pipe of KA2S steel filled with granular activated aluminum oxide for about 23 inches of its length. From the dissociation chamber the vapor mixture passed through the cooler wherein it was cooled to about 80° C. The cooled mixture passed through the recombination chamber maintained at about 70° C., which consisted of a 0.5 inch KA2S steel pipe filled with granular kaolin for about 30 inches of its length. The reacted vapor mixture then passed through a condensing apparatus wherein the major portion thereof was condensed. The residual vapors were scrubbed with water, dried over calcium chloride, and condensed to a liquid in a trap cooled to about −80° C. The condensates were then combined and the resultant solution was analyzed and and found to contain approximately 1.662 kilograms of tertiary-butyl chloride, 0.46 kilogram of isobutyl chloride, 0.172 kilogram of a normal butylene, and 0.231 kilogram of higher boiling material. The yield of tertiary-butyl chloride was 55.3 per cent of theoretical, based on the quantity of isobutyl chloride used.

Example 4

462 grams of isobutyl chloride was passed at a substantially constant rate, during a period of 5 hours 55 minutes, through a reaction system consisting of a vaporizer, a dissociation chamber, a cooler, a recombination chamber, and a condensing apparatus. The dissociation chamber consisted of a 0.5 inch KA2S steel pipe filled with fuller's earth for about 23 inches of its length. The recombination chamber consisted of a 0.5 inch KA2S steel pipe filled with granular anhydrous calcium chloride for about 30 inches of its length. During passage through said reaction system the isobutyl chloride was first vaporized and the vapors were passed through the dissociation chamber which was maintained at about 256° C. From the dissociation chamber the vapors passed through the cooler wherein they were cooled to about 80° C. The cooled vapors passed through the recombination chamber which was maintained at about 70° C. The reacted vapors then passed through a condensing apparatus wherein 388.1 grams of chloro-isobutanes was condensed and collected. The residual vapors were scrubbed with water, dried, and condensed to a liquid in a trap cooled to about −80° C. The condensates were then combined and the resultant solution was analyzed and found to consist of approximately 268 grams of tertiary-butyl chloride, 37 grams of isobutyl chloride, 22.4 grams of a normal butylene, and 51.4 grams of higher boiling material. The yield of tertiary-butyl chloride was 58 per cent of theoretical, based on the quantity of isobutyl chloride used.

Example 5

415 grams of isobutyl chloride was passed, during a period of 5 hours 5 minutes, through a reaction system similar to that described in Example 4, except that Tonsil (an acid activated bleaching earth) was employed as a dissociation catalyst. The mode of operation and the respective temperatures at which the dissociation and recombination catalysts were maintained were similar to those described in Example 4. Through operating in such manner there was collected a solution consisting of 193 grams of tertiary-butyl chloride, 24.0 grams of isobutyl chloride, 36.0 grams of a normal butylene, and 38.5 grams of higher boiling material. The yield of tertiary-butyl chloride was 56 per cent of theoretical.

*Example 6*

810 grams of crude isobutyl chloride containing approximately 4.2 per cent its weight of tertiary-butyl chloride and 0.5 per cent of chloro-isobutylenes was passed at a substantially constant rate, during a period of 11 hours, through a reaction system consisting of a vaporizer, a dissociation chamber, a cooler, a recombination chamber, and a condensing apparatus. The dissociation chamber consisted of a 0.75 inch KA2S steel pipe 15 inches long filled with 7.3 cubic inches of KA2S steel turnings and having a copper thermocouple well inserted lengthwise through said turnings. The recombination chamber consisted of a 0.5 inch KA2S steel pipe filled with granular kaolin for about 33 inches of its length. During passage through said reaction system, the isobutyl chloride was first vaporized and the vapors were passed through the dissociation chamber which was maintained at about 525° C. From the dissociation chamber the vapors passed through the cooler wherein they were cooled to about 80° C. The cooled vapors passed through the recombination chamber which was maintained at about 70° C. The reacted vapors then passed through a condensing apparatus wherein 616 grams of chloro-isobutanes was condensed and collected. The residual vapors were scrubbed with water, dried, and condensed to a liquid in a trap cooled to −80° C. The condensates were combined and the resultant solution was analyzed and found to consist of approximately 505.5 grams of tertiary-butyl chloride, 82.5 grams of isobutyl chloride, 82.5 grams of a normal butylene, and 3.0 grams of higher boiling material. The yield of tertiary-butyl chloride was 61.2 per cent of theoretical, based upon the quantity of isobutyl chloride employed.

*Example 7*

An iron pipe 6 inches in diameter and 3 feet long was filled with aluminum oxide which had previously been employed as a dissociation catalyst in the present reaction until the conversion had dropped to a low figure and the catalyst had become black through deposition of carbon and/or organic materials. The pipe was heated to about 190° C., after which external heating was discontinued and air was passed through said pipe at a rate of approximately 0.2–0.4 cubic feet per minute. The temperature of the aluminum oxide rose spontaneously to about 650° C. at the point at which the current of air was first contacted therewith and a hot zone, varying in temperature from about 630° to 770° C., gradually travelled through the charge of aluminum oxide as the passage of air through the pipe was continued. After the hot zone had migrated through the entire charge, the latter was greyish-white in color. The so treated aluminum oxide catalyst was found to have been completely reactivated and to be entirely suitable for re-employment as a catalyst to promote the conversion of isobutyl chloride into tertiary-butyl chloride.

Examples 1 and 2 illustrate two of the various ways in which isobutyl chloride which is contaminated with chloro-isobutylenes can be purified prior to converting the same into tertiary-butyl chloride. As has previously been pointed out, isobutyl chloride which is prepared from isobutane usually contains chloro-isobutylenes as impurities and it is important that such impurities be removed from the isobutyl chloride prior to converting the latter into tertiary-butyl chloride according to our method.

Example 3 illustrates the conversion of isobutyl chloride into tertiary-butyl chloride using activated aluminum oxide as a catalyst to promote the dissociation of isobutyl chloride into isobutylene and hydrogen chloride, and kaolin as a catalyst to promote recombination of the isobutylene and hydrogen chloride to form tertiary-butyl chloride.

Examples 4 and 5 illustrate the employment of fuller's earth and of Tonsil, respectively, as dissociation catalysts and of calcium chloride as a recombination catalyst.

Example 6 illustrates the employment of a metal as a catalyst to promote the dissociation of isobutyl chloride into isobutylene and hydrogen chloride.

Example 7 describes the reactivation of aluminum oxide which has become relatively inactive through employment as a dissociation catalyst to promote conversion of isobutyl chloride into tertiary-butyl chloride.

The principle of our invention may be practiced in ways other than those heretofore specifically stated. For instance, after dissociating isobutyl chloride vapors at a high temperature into isobutylene and hydrogen chloride, the operation of cooling the dissociated vapors may, if desired, be carried out in the presence of a reaction catalyst. In order to obtain a high yield of tertiary-butyl chloride, however, it is important that the dissociated reaction mixture be contacted at a temperature below 150° C. with a catalyst capable of promoting reaction between isobutylene and hydrogen chloride to form tertiary-butyl chloride.

While we may employ a highly active catalyst such as antimony trichloride, bismuth trichloride, etc., to promote the recombination of isobutylene with hydrogen chloride, we prefer to employ a less active catalyst, e. g. kaolin, aluminum oxide, Tonsil, calcium chloride, etc., for such purpose. During the operation of dissociating isobutyl chloride into isobutylene and hydrogen chloride, some normal butylene usually is formed. If a highly active catalyst is employed to promote recombination of the isobutylene and hydrogen chloride, a portion of the latter may combine with the normal butylene to form secondary butyl chloride. The last mentioned compound boils at substantially the same temperature as does isobutyl chloride and cannot readily be separated from the latter. By employing a less active catalyst, e. g. kaolin, etc., the recombination of isobutylene with hydrogen chloride proceeds smoothly and formation of secondary butyl chloride is substantially avoided.

After a dissociated isobutyl chloride mixture has been contacted with a recombination catalyst, to form tertiary-butyl chloride, a mixture of tertiary-butyl chloride and unreacted isobutyl chloride may be condensed from the reaction mixture to leave a gaseous mixture consisting substantially of hydrogen chloride and a normal butylene. The hydrogen chloride may be removed from such residual gases in any of the usual ways, e. g. by scrubbing with water, by reacting the hydrogen chloride with a base, etc., to leave vapors which consists substantially of the normal butylene.

In converting isobutyl chloride into tertiary-butyl chloride according to the present method, the reacting vapors may be maintained under any desired pressure whether such pressure be atmospheric, sub-atmospheric, or superatmospheric.

Other modes of applying the principle of our invention may be employed instead of those explained, change being made as regards the method herein described, provided the step or steps stated by any of the following claims or the equivalent of such stated step or steps be employed.

We therefore particularly point out and distinctly claim as our invention:—

1. In a method wherein isobutyl chloride is converted to tertiary-butyl chloride by heating isobutyl chloride vapors in the presence of a catalyst capable of dissociating isobutyl chloride into isobutylene and hydrogen chloride and then passing the dissociated vapors into contact with a catalyst capable of promoting recombination of the isobutylene and hydrogen chloride to form tertiary-butyl chloride, the steps which consist in cooling the dissociated vapor mixture to a temperature below about 150° C. and contacting the cooled mixture with the recombination catalyst.

2. In a method wherein isobutyl chloride is converted to tertiary-butyl chloride by heating isobutyl chloride vapors in the presence of a catalyst capable of promoting dissociation of isobutyl chloride into isobutylene and hydrogen chloride and then passing the dissociated vapors into contact with a catalyst capable of promoting recombination of the isobutylene and hydrogen chloride to form tertiary-butyl chloride, the steps which consist in carrying out the dissociation reaction at a temperature above about 200° C., then cooling the dissociated vapor mixture to a temperature below about 150° C. and contacting the cooled mixture with the recombination catalyst.

3. In a method of making tertiary-butyl chloride, the steps which consist in dissociating isobutyl chloride into isobutylene and hydrogen chloride at a temperature above about 200° C., cooling the resultant mixture to a temperature below about 150° C., and recombining the isobutylene and hydrogen chloride, at a temperature below about 150° C., to form tertiary-butyl chloride.

4. The method which comprises contacting isobutyl chloride vapors, at a temperature above about 200° C., with a catalyst capable of promoting dissociation of isobutyl chloride into isobutylene and hydrogen chloride, cooling the reaction mixture to a temperature below about 150° C., and contacting the cooled mixture with a catalyst capable of promoting chemical combination of a butylene with hydrogen chloride.

5. The method which comprises contacting isobutyl chloride vapors, at a temperature above about 200° C., with a catalyst capable of promoting dissociation of isobutyl chloride to form isobutylene, a normal butylene, and hydrogen chloride, cooling the reaction mixture to a temperature below about 150° C., and contacting the cooled mixture with a catalyst capable of promoting reaction between isobutylene and hydrogen chloride to form tertiary-butyl chloride.

6. The method which comprises contacting isobutyl chloride vapors, at a temperature above about 230° C., with a catalyst capable of promoting dissociation of isobutyl chloride to form isobutylene, a normal butylene, and hydrogen chloride, cooling the reaction mixture to a temperature below about 100° C., contacting the cooled mixture with a catalyst capable of promoting reaction between isobutylene and hydrogen chloride to form tertiary-butyl chloride, condensing isobutyl chloride and tertiary-butyl chloride from the reaction mixture to leave a gaseous mixture consisting substantially of hydrogen chloride and the normal butylene, and removing hydrogen chloride from said gaseous mixture to obtain residual vapors consisting substantially of the normal butylene.

7. In a method of making tertiary-butyl chloride, the steps which consist in contacting isobutyl chloride vapors, at a temperature above about 200° C., with a catalyst capable of promoting dissociation of isobutyl chloride into isobutylene and hydrogen chloride, cooling the reaction mixture to a temperature below about 150° C., and contacting the cooled mixture with a catalyst capable of promoting reaction between isobutylene and hydrogen chloride to form tertiary-butyl chloride.

8. In a method of making tertiary-butyl chloride, the steps which consist in contacting a current of isobutyl chloride vapors with a catalyst capable of promoting dissociation of isobutyl chloride into isobutylene and hydrogen chloride while maintaining said catalyst at a temperature above about 230° C., cooling the resultant vapor mixture to a temperature below about 100° C., and contacting a current of the cooled vapors, at a temperature below about 100° C., with a catalyst capable of promoting reaction between isobutylene and hydrogen chloride to form tertiary-butyl chloride.

9. In a method of making tertiary-butyl chloride, the steps which consist in vaporizing isobutyl chloride, preheating the vapors to a temperature approaching that at which said vapors are to be dissociated to form isobutylene and hydrogen chloride, contacting the preheated vapors with a catalyst capable of promoting dissociation of isobutyl chloride into isobutylene and hydrogen chloride while maintaining said catalyst at a temperature above about 200° C., thereafter cooling the vapors to a temperature below about 150° C. and contacting the cooled reaction mixture, at a temperature below about 150° C., with a catalyst capable of promoting reaction between isobutylene and hydrogen chloride to form tertiary-butyl chloride.

10. In a method of making tertiary-butyl chloride, the steps which consist in vaporizing isobutyl chloride, preheating the vapors to a temperature approaching that which said vapors are to be dissociated to form isobutylene and hydrogen chloride, contacting the preheated vapors with a catalyst capable of promoting dissociation of isobutyl chloride into isobutylene and hydrogen chloride while maintaining said catalyst at a temperature above about 230° C., thereafter cooling the vapors to a temperature below about 100° C., and contacting the cooled reaction mixture, at a temperature below about 100° C., with a catalyst capable of promoting reaction between isobutylene and hydrogen chloride to form tertiary-butyl chloride.

11. In a method of making tertiary-butyl chloride, the steps which consist in contacting isobutyl chloride vapors at a temperature above about 400° C. with a catalyst capable of promoting dissociation of isobutyl chloride into isobutylene and hydrogen chloride, then cooling the mixture to a temperature below about 150° C. and contacting the cooled mixture with a catalyst capable of promoting reaction between isobutylene and hydrogen chloride to form tertiary-butyl chloride.

12. In a method of making tertiary-butyl chloride, the steps which consist in contacting isobutyl chloride vapors, at a temperature above about 500° C. with a catalyst capable of promoting dissociation of isobutyl chloride into isobutylene and hydrogen chloride, then cooling the vapors to a temperature below about 150° C. and contacting the cooled mixture with a catalyst capable of promoting reaction between isobutylene and hydrogen chloride to form tertiary-butyl chloride.

13. In a method of making tertiary-butyl chloride, the steps which consist in contacting isobutyl chloride vapors with a nickel-chromium steel while maintaining the latter at a temperature above about 500° C., then cooling the vapors to a temperature below about 100° C. and contacting the cooled mixture with a catalyst capable of promoting reaction between isobutylene and hydrogen chloride to form tertiary-butyl chloride, while maintaining the last mentioned catalyst at a temperature below about 100° C.

14. In a method of making tertiary-butyl chloride, the steps which consist in treating a mixture containing isobutyl chloride and a chloro-isobutylene with a compound capable of reacting with the chloro-isobutylene to form a saturated derivative of the latter, separating isobutyl chloride from the resultant mixture, vaporizing the isobutyl chloride, contacting the vapors with a catalyst capable of promoting dissociation of isobutyl chloride into isobutylene and hydrogen chloride while maintaining said catalyst at a temperature above about 200° C., thereafter cooling the vapors to a temperature below about 150° C., and contacting the cooled reaction mixture, at a temperature below about 150° C., with a catalyst capable of promoting reaction between isobutylene and hydrogen chloride to form tertiary-butyl chloride.

15. In a method of making tertiary-butyl chloride, the steps which consist in treating a mixture containing isobutyl chloride, a chloro-isobutylene and water with chlorine in amount sufficient to react with the chloro-isobutylene present while stirring the mixture vigorously, separating the organic layer of the chlorinated mixture, fractionally distilling said organic layer to separate isobutyl chloride therefrom, vaporizing the isobutyl chloride, contacting the vapors with a catalyst capable of promoting dissociation of isobutyl chloride into isobutylene and hydrogen chloride while maintaining said catalyst at a temperature above about 230° C., thereafter cooling the vapors to a temperature below about 100° C., and contacting the cooled reaction mixture, at a temperature below about 100° C., with a catalyst capable of promoting reaction between isobutylene and hydrogen chloride to form tertiary-butyl chloride.

16. In a method of making tertiary-butyl chloride, the steps which consist in treating a mixture containing isobutyl chloride, a chloro-isobutylene, water, and a compound selected from the class consisting of ferric chloride and sulphuric acid, with chlorine in amount sufficient to react with the chloro-isobutylene present while stirring the mixture vigorously, separating the organic layer of the chlorinated mixture, fractionally distilling said organic layer to separate isobutyl chloride therefrom, vaporizing the isobutyl chloride, contacting the vapors with a catalyst capable of promoting dissociation of isobutyl chloride into isobutylene and hydrogen chloride while maintaining said catalyst at a temperature above about 230° C., thereafter cooling the vapors to a temperature below about 100° C., and contacting the cooled reaction mixture, at a temperature below about 100° C., with a catalyst capable of promoting reaction between isobutylene and hydrogen chloride to form tertiary-butyl chloride.

17. In a method of making tertiary-butyl chloride, the steps which consist in treating a mixture containing isobutyl chloride, a chloro-isobutylene, water and a compound selected from the class consisting of ferric chloride and sulphuric acid, with chlorine in amount sufficient to react with the chloro-isobutylene present while stirring the mixture vigorously, separating the organic layer of the chlorinated mixture, fractionally distilling said organic layer to separate isobutyl chloride therefrom, passing a continuous current of the isobutyl chloride vapors first through a preheater wherein the vapors are heated to a temperature approaching that at which they are subsequently to be dissociated to form isobutylene and hydrogen chloride, passing the current of preheated vapors into contact with aluminum oxide, the latter being at a temperature above about 230° C., thereafter passing the vapor mixture through a cooling zone wherein the vapors are cooled to a temperature below about 100° C., passing the cooled vapors into contact with a catalyst capable of promoting reaction between isobutylene and hydrogen chloride to form tertiary-butyl chloride while maintaining the last mentioned catalyst at a temperature below about 100° C., continuing the passage of vapors through the successive operations described above until the aluminum oxide catalyst has been rendered relatively inactive, thereafter discontinuing passage of isobutyl chloride into contact with the relatively inactive aluminum oxide and reactivating the latter by first heating the same to a temperature above about 190° C. and passing a current of oxygen over the heated aluminum oxide while maintaining the latter at a temperature below about 800° C.

18. In a method of making tertiary-butyl chloride, the steps which consist in dissociating isobutyl chloride into isobutylene and hydrogen chloride at a temperature above about 200° C., and thereafter recombining the isobutylene and hydrogen chloride, at a temperature below about 150° C., to form tertiary-butyl chloride.

19. The method which comprises contacting isobutyl chloride vapors, at a temperature above about 200° C., with a catalyst capable of promoting dissociation of isobutyl chloride into isobutylene and hydrogen chloride, and thereafter contacting the dissociated mixture, at a temperature below about 150° C., with a catalyst capable of promoting reaction between isobutylene and hydrogen chloride to form tertiary-butyl chloride.

HOWARD S. NUTTING.
EDGAR C. BRITTON.
MYRON E. HUSCHER.
PETER S. PETRIE.